US010870500B2

(12) United States Patent
Iwata et al.

(10) Patent No.: US 10,870,500 B2
(45) Date of Patent: Dec. 22, 2020

(54) LUGGAGE COMPARTMENT DOOR LOCK CHECKING TOOL (71) Applicant: Komy Co., Ltd., Kawaguchi (JP)

(72) Inventors: Yoshiyuki Iwata, Kawaguchi (JP); Tsuyoshi Watanabe, Kawaguchi (JP)

(73) Assignee: Komy Co., Ltd., Saitama (JP)

( * ) Notice: Subject to any disclaimer, the term of this patent is extended or adjusted under 35 U.S.C. 154(b) by 204 days.

(21) Appl. No.: 15/754,737

(22) PCT Filed: Mar. 28, 2016

(86) PCT No.: PCT/JP2016/059887
§ 371 (c)(1),
(2) Date: Feb. 23, 2018

(87) PCT Pub. No.: WO2017/168508
PCT Pub. Date: Oct. 5, 2017

(65) Prior Publication Data
US 2018/0237166 A1    Aug. 23, 2018

(51) Int. Cl.
*B64F 5/60* (2017.01)
*B64D 11/00* (2006.01)
(Continued)

(52) U.S. Cl.
CPC ............ *B64F 5/60* (2017.01); *B25G 1/102* (2013.01); *B25J 1/04* (2013.01); *B25J 15/0616* (2013.01); *B64D 11/003* (2013.01)

(58) Field of Classification Search
CPC .. B64F 5/60; B25G 1/102; B25G 1/10; B25G 1/04; B25J 1/04; B25J 15/0616; B64D 11/003

(Continued)

(56) References Cited

U.S. PATENT DOCUMENTS 4,248,465 A * 2/1981 Halstead ............... B25J 1/04
                                               294/104
8,210,584 B2 * 7/2012 Hiltz ................. B62D 53/0857
                                               294/175
(Continued)

FOREIGN PATENT DOCUMENTS

JP    2004-251297 A    9/2004
JP    2010-523405 A    7/2010

OTHER PUBLICATIONS

Anonymous: "AmazonBasics 67-Inch Monopod: Amazon.de: Camera & Photo," Oct. 18, 2013, XP55632145, Retrieved from the Internet : URL:https://www.amazon.de/AmazonBasics-WT1003-Einbeinstativ-170-cm/dp/B00FAYL1Yu/ref=pd_sbs_421_9?ie=UTF8&language=en_GB&pd_rd_i=B00FAYL1YU&pd_rd_r=a8649058-25a4-4a7d-8302-4f31541323fe&pd_rd_w=6nYyC&pd_rd_wg=k7DGj&pf_rd_p=184816e4-edb5-4587-8faf-776e0027d8d1&pf_rd_r=PAHP077M12D7A48MW6WZ&psc=1&refRID=PAH.

*Primary Examiner* — David B. Thomas
(74) *Attorney, Agent, or Firm* — Foley & Lardner LLP (57)    ABSTRACT Provided is a lock checking tool for a luggage compartment door that, when checking and correcting an incomplete locked state of the luggage compartment door, makes it possible to work without taking an unnatural posture, and is made to be easy to carry and not obstruct other work. The a lock checking tool is for a luggage compartment door in which a main body is formed into a telescopic structure by a plurality of tube materials of different diameters, a grip section is provided to the tube material on the outermost side of the main body, a pressure contact part is provided at a tip end section of the tube material on the innermost side, and the length of the main body can be fixed by a fixing means.

6 Claims, 7 Drawing Sheets (A)

(B)

(51) Int. Cl.
 *B25J 1/04* (2006.01)
 *B25J 15/06* (2006.01)
 *B25G 1/10* (2006.01)
(58) Field of Classification Search
 USPC .......................................................... 81/15.9
 See application file for complete search history.

(56) References Cited

U.S. PATENT DOCUMENTS

2008/0251640 A1 10/2008 Johnson et al.
2010/0024605 A1 2/2010 Hiltz
2010/0201142 A1 8/2010 Tu

* cited by examiner

LUGGAGE COMPARTMENT DOOR LOCK CHECKING TOOL

CROSS-REFERENCE TO RELATED APPLICATIONS

This application is a National Stage application of PCT/JP2016/059887, filed Mar. 28, 2016.

TECHNICAL FIELD

The present invention relates to a lock checking tool for a luggage compartment door, and more specifically relates to the lock checking tool for a luggage compartment door which enables performing operations without taking an unnatural posture when checking and correcting an incomplete locked state of the luggage compartment door and is made to be easy to carry and not obstruct other work.

BACKGROUND ART

Above the seats of a passenger aircraft, overhead luggage compartments which store luggage for passengers are provided, and at the overhead luggage compartments, the doors for preventing from falling of the luggage are provided (see, for example, Patent document 1). An opening/closing system of the door has a specification that the door opens or closes based on an upper end side as a fulcrum point. When the door is opened, a lock is released and the door is opened to the upside of the front, and alternatively, when the door is closed, the door is lowered to the lower side and pushed until a sound of the lock is confirmed. By locking the door, it is possible to prevent the luggage inside the compartment from flying out due to turbulence, etc., during the flight.

When boarding, cabin crew or passengers open and close the luggage compartment door as described above to place the luggage in the compartment, but all doors are not necessarily in a completely locked state, and are sometimes in a half-locked state. Therefore, the cabin crew always go round in the aircraft before take-off by checking by hand all doors of overhead luggage compartments whether there is a door in an incomplete locked state, and when finding the door in an incomplete locked state, the cabin crew pushes the door to shift to an complete locked state.

However, since the overhead luggage compartment is located at a high position, i.e., above the seats, the hand checking and pushing operations performed to the door by the cabin crew (especially a female whose height is 160 cm or less) are the operations which force, to the cabin crew, unnatural postures such as standing on a seat, stretching or standing on tiptoe. Further, this operation may cause problems for passengers, and thus, the remediation measures thereof have been an object.

PRIOR ART DOCUMENTS

Patent Documents

Patent document 1: Published Japanese Translation of PCT International Publication for Patent Application (Kohyo) No. 2010-523405

SUMMARY OF THE INVENTION

Technical Problem

An object of the present invention is to provide a lock checking tool for a luggage compartment door which enables performing operations without taking an unnatural posture when checking and correcting an incomplete locked state of a luggage compartment door and is made to be easy to carry and not obstruct other work.

Solution to Problem

To achieve the above object, the lock checking tool for a luggage compartment door of the present invention comprises a main body formed into a telescopic structure by a plurality of tube materials of different diameters, a grip section provided to the tube material on the outermost side of the main body, a pressure contact part provided to a tip end section of the tube material on the innermost side of the main body, and a fixing means for fixing a length of the main body.

Advantageous Effects of Invention

When the lock checking tool for a luggage compartment door of the present invention is used for checking and correcting the incomplete locked state of the door of an overhead luggage compartment, the cabin crew who performs the operations can easily check and correct the incomplete locked state of the door without taking the unnatural posture such as standing on the foot putting stool provided to the seat, stretching, and standing on tiptoe. By shortening the main body to the shortest state, the lock checking tool can be put in the airline-company-specified portable bag attached to the main body of the cabin crew, and thus, the lock checking tool does not obstruct other work.

DESCRIPTION OF EMBODIMENTS

Descriptions are given below based on embodiments in which the present invention is represented in the drawings.

Figure 1:
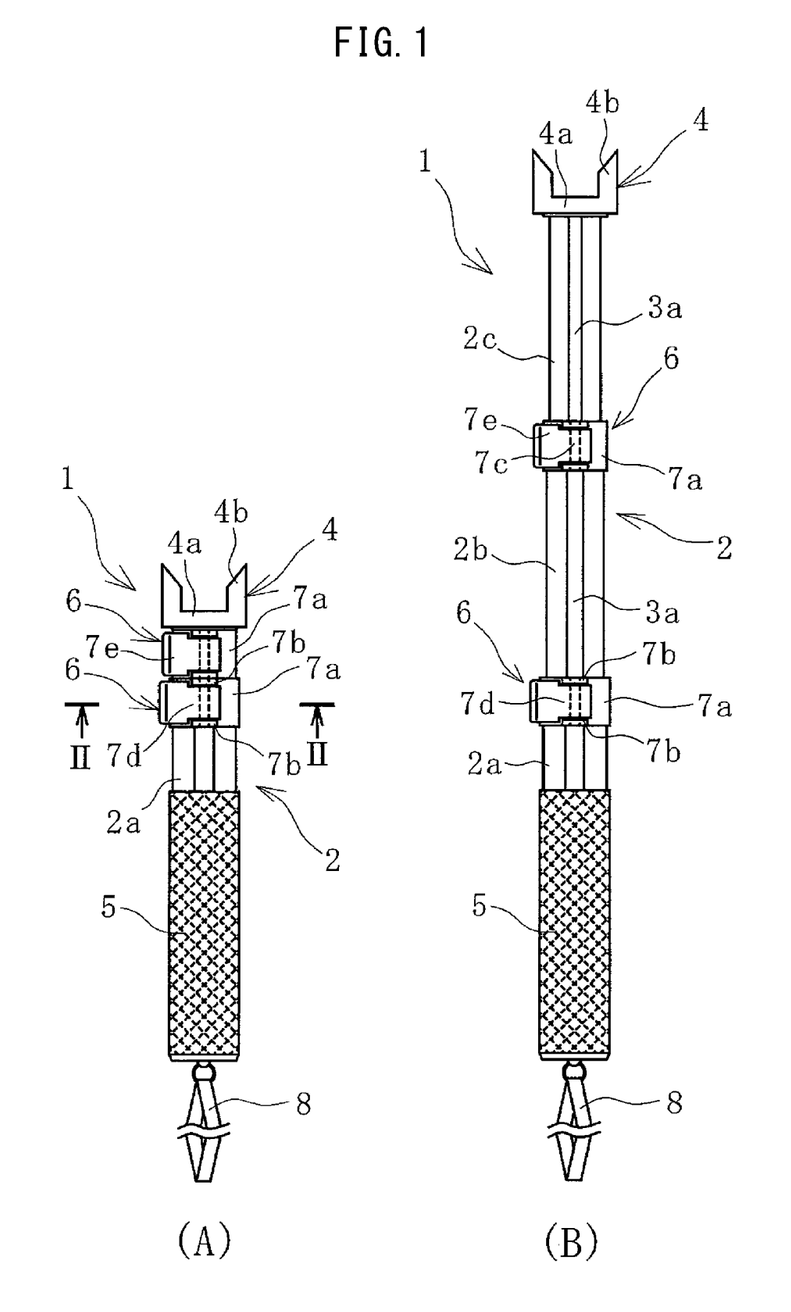
FIG. 1(A) is a front elevational view exemplifying a lock checking tool having a main body in the shortest state of the present invention and FIG. 1(B) is a front elevational view exemplifying the lock checking tool having the main body in the longest state of the present invention.
Figure 2:
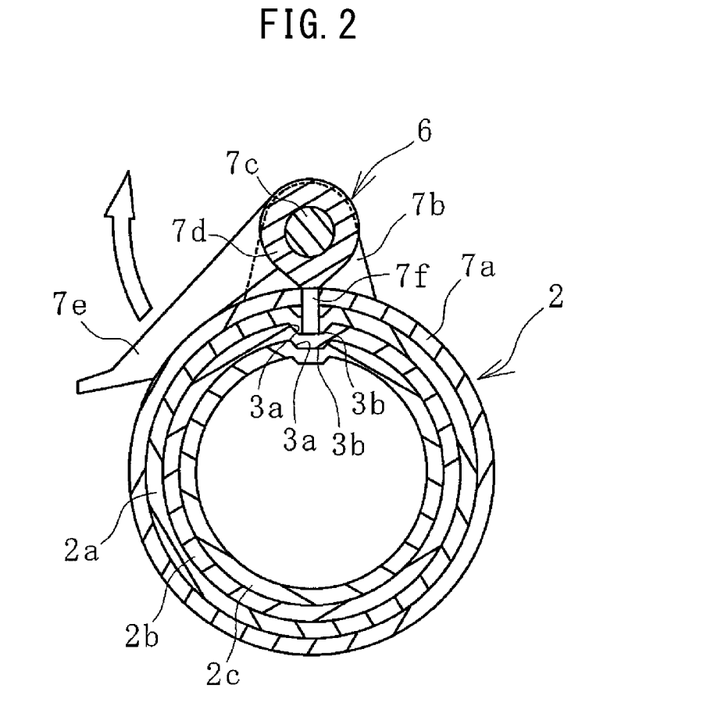
FIG. 2 is a sectional view taken along a line II-II of FIG. 1(A).
Figure 3:
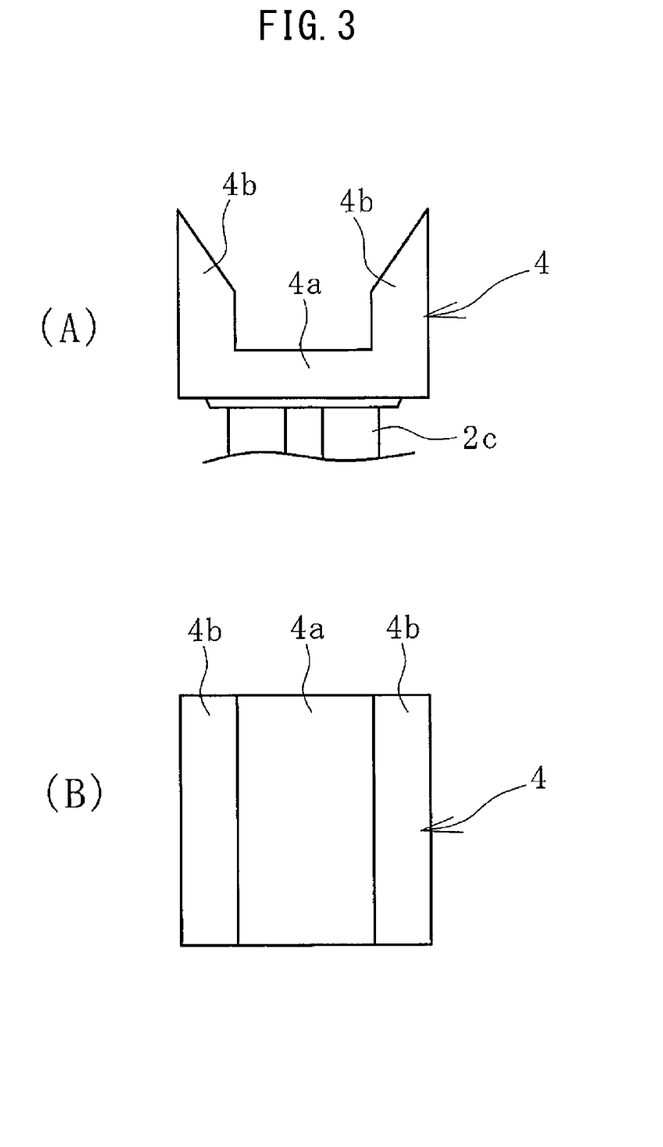
FIG. 3(A) is an explanatory drawing illustrating, at a front view, a pressure contact part of FIG. 1
FIG. 3(B) is an explanatory drawing illustrating, at a planar view, the pressure contact part.

A lock checking tool 1 for a luggage compartment door exemplified in FIG. 1 to FIG. 3 of the present invention can change the length from the shortest state illustrated in FIG. 1(A) to the longest state illustrated in FIG. 1(B).

The lock checking tool 1 includes a main body 2 of the telescopic structure. The main body 2 of the telescopic structure is formed from three tube materials 2a, 2b, 2c having different diameters which fit with one another in a relatively sliding manner in a tube axis direction, and the length in the tube axis direction can be switched to any length between the length shortened to the shortest state and the length extended to the longest state. The number of tube materials 2a to 2c forming the main body 2 is not limited to three, but the main body 2 may be formed from two or more tube materials having different diameters.

The tube materials 2a to 2c are formed from substances such as the metal and the hard resin. As the metal, the stainless steel, the aluminum alloy, etc., can be used.

The unevenness machining is applied to the tube materials 2a, 2b, 2c respectively in the tube axis direction to form guide grooves 3a on an outer surface side and guide projections 3b on an inner surface side. Among these three tube materials 2a, 2b, 2c, the guide projection 3b of the tube material 2a engages with the guide groove 3a of the tube material 2b which is inside of the tube material 2a and similarly the guide projection 3b of the tube material 2b engages with the guide groove 3a of the tube material 2c which is inside of the tube material 2b. This allows the tube materials 2a, 2b, 2c to slide in the tube axis direction.

A grip section 5 and a strap 8 are provided to the tube material 2a on the outermost side of the main body 2. Although the circumference surface itself of the tube material 2a may be the grip section 5, preferably the grip section 5 may be configured by wrapping any sheet of the rubber, the soft resin, etc. This enables obtaining a nonslip effect. When the tube material 2a itself serves as the grip section 5, for example the knurling, etc., may be applied to the surface of the tube material 2a to obtain an uneven surface. The strap 8 may be provided to a rear end of the tube material 2a. The strap 8 is convenient when the lock checking tool 1 is carried, but is not always indispensable and may be omitted.

The lock checking tool 1 has fixing means 6 for fixing the length of the main body 2 having the telescopic structure. In this embodiment, the length of the main body 2 can be fixed to any length by the fixing means 6. The fixing means 6 is provided to the end of the outermost tube material 2a having the largest diameter as described below so as to lock a relative movement of the tube material 2b which is inside of the tube material 2a. In other words, a ring 7a is fixed to an outer periphery of the end of the tube material 2a, a pair of front and back brackets 7b is integrally formed to the surface of the ring 7a, and a shaft 7c is bridged between the pair of front and back brackets 7b. A cam 7d is fixed on the shaft 7c to be turned by a lever 7e, and a pin 7f is interposed between the cam 7d and the guide groove 3a of the tube material 2b so as to pass through the ring 7a and the guide groove 3a of the outermost tube material 2a.

The pin 7f is pressed to the surface of the guide groove 3a of the tube material 2b by the cam 7d which is turned through the lever 7e. By pressing of the pin 7f, the tube material 2b is locked such that the tube material 2b does not move in a shaft direction relative to the tube material 2a. Locking of the tube material 2b is released if the lever 7e is pulled up in an arrow direction to release pressing of the cam 7d, because the pin 7f no longer presses.

The fixing means 6 provided to the end of the tube material 2b having the second largest diameter also has the same configuration as explained above. The fixing means 6 locks the relative movement of the innermost tube material 2c having the smallest diameter with respect to the tube material 2b having the second largest diameter.

When the main body 2 is elongated to the longest state and the relative movements between the tube materials 2a, 2b and between the tube materials 2b, 2c are locked by pieces of fixing means 6, 6 which are present at two positions, the length of the lock checking tool 1 is fixed in the longest state. Alternatively, when the main body 2 is shortened to the shortest state and the relative movements between the tube materials 2a, 2b and between the tube materials 2b, 2c are locked by the pieces of fixing means 6, 6 which are present at two positions, the length of the lock checking tool 1 is fixed in the shortest state. Similarly, if the main body 2 is locked while having any middle length between the longest state and the shortest state, the length of the lock checking tool 1 can be fixed to the middle length.

To the tip end section of the tube material 2c on the innermost side of the main body 2, a pressure contact part 4 which is pressured against a door 11 of an overhead luggage compartment 10 is provided. The pressure contact part 4 comprises a base 4a and a plurality of elastic pieces 4b which are integrally formed to the base 4a so as to extend to a tip side. The pressure contact part 4 is formed from elastic materials such as rubber and soft resin. The base 4a and the elastic piece 4b may be formed from different materials, but in that case, the elastic piece 4b is at least formed from the elastic material such as rubber and soft resin.

Two elastic pieces 4b are projected in a point symmetry on the surface of the base 4a with respect to the center of the base 4a in a planar view. Each elastic piece 4b becomes thin gradually as it goes to the tip side. In the example illustrated in the drawing, the elastic piece 4b has a sloping surface which slopes upward from the inside to the outside and becomes thin as it goes to the tip side.

Figure 5:
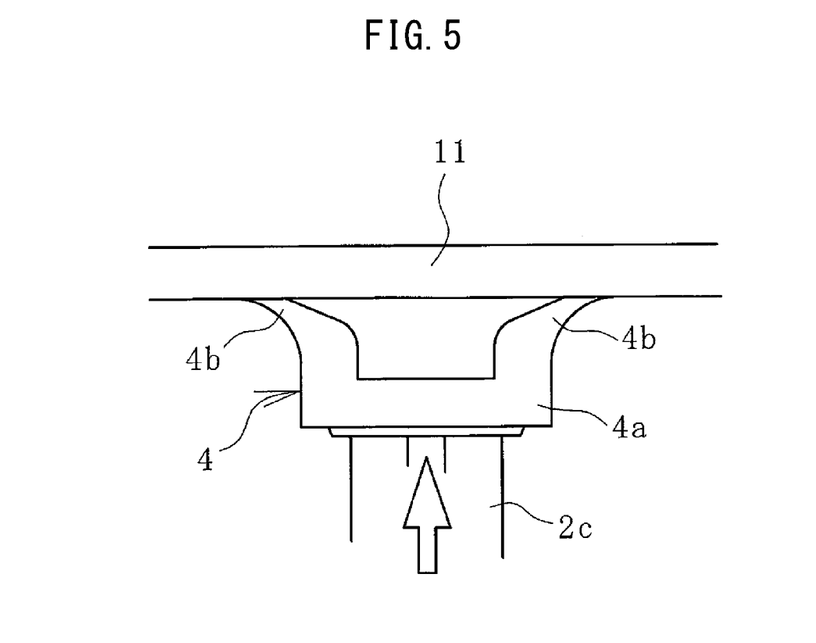
FIG. 5 is an explanatory drawing exemplifying a state where the pressure contact part is pushed and contacted with a door.

When the tip having such shape of the pressure contact part 4 is pushed and in contact with the surface of the door 11 of the overhead luggage compartment 10, as illustrated in FIG. 5, the elastic piece 4b widens toward the outside to make an elastic deformation and is attached firmly to the surface of the door 11 to prevent sliding. Thus, the pressing force from the main body 2 of the lock checking tool 1 can be effectively transmitted.

Figure 4:
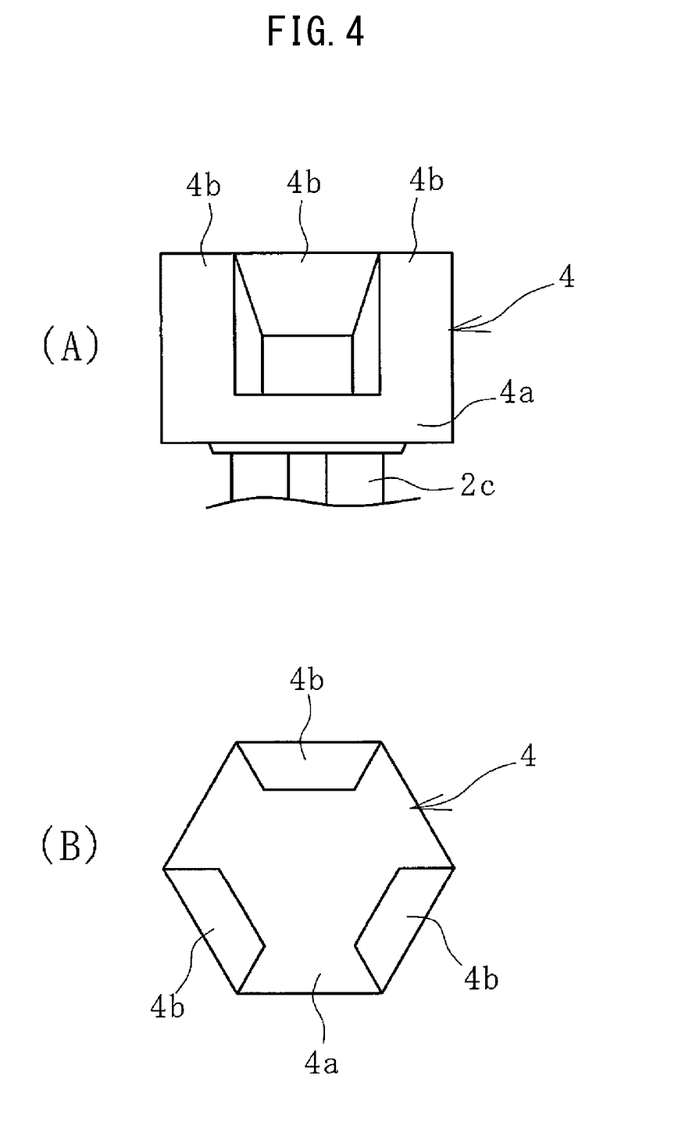
FIG. 4(A) is an explanatory drawing illustrating a variation of the pressure contact part at the front view and FIG. 4(B) is an explanatory drawing illustrating the pressure contact part at the planar view.

Although the number of elastic pieces 4b in the pressure contact part 4 as exemplified in FIG. 3 is two, as exemplified in FIG. 4, the number of elastic pieces 4b may be three or more. Arrangement of the elastic pieces 4b to the base 4a is preferably in a point symmetry with respect to the center of the base 4a in a planar view. With this arrangement, the pressing force from the main body 2 of the lock checking tool 1 can be transmitted to the door 11 in well balance without an inclination in a certain direction.

Usages of the lock checking tool 1 are described below.

Figure 6:
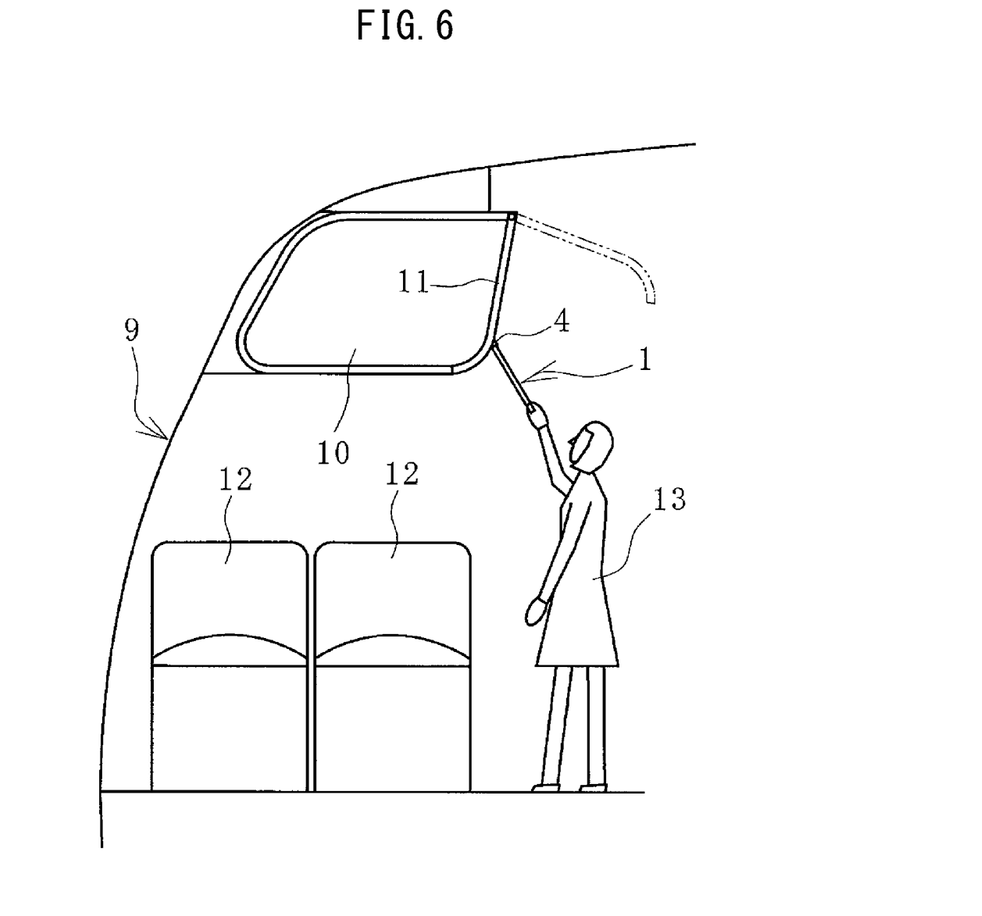
FIG. 6 is an explanatory drawing exemplifying the checking and the correction of the imperfect locking state of the door of an overhead luggage compartment using the lock checking tool of the present invention.

As exemplified in FIG. 6, in a passenger aircraft 9, the overhead luggage compartment 10 is positioned above seat rows 12. A luggage compartment door 11 has a structure of the door swinging up to the upside of the front based on the upper end side as the fulcrum point. A cabin crew 13 goes round in the passenger aircraft 9 before the aircraft takes off and checks all overhead luggage compartments 10 to determine whether there is a door 11 in the incomplete locked state.

When the cabin crew 13 uses the lock checking tool 1 of the present invention to check the incomplete locked state of a luggage compartment door 11, the length of the main body 2 of the lock checking tool 1 is adjusted in advance to the length corresponding to the cabin crew's own height and allowing easy operations. The cabin crew 13 may hold the lock checking tool 1 in one hand, bring the pressure contact part 4 at the tip into contact with the surface of an overhead luggage compartment door 11, and push the door. If the lock of the door of an overhead luggage compartment 11 is in the incomplete locked state, by the pushing operation, the lock generates the clicking engagement sound and the incomplete locked state is corrected to the locking state.

In this way, the cabin crew 13 uses the lock checking tool 1 by adjusting the length of the lock checking tool 1 to the length corresponding to the cabin crew's own height and allowing easy operation so that when inspecting the incomplete locked state of the door of an overhead luggage compartment 11, the cabin crew 13 can easily perform the checking operation and the correction operation without taking an unnatural posture, such as stretching and standing on tiptoe. Further, it is possible to prevent giving displeasure to the passengers.

Figure 7:
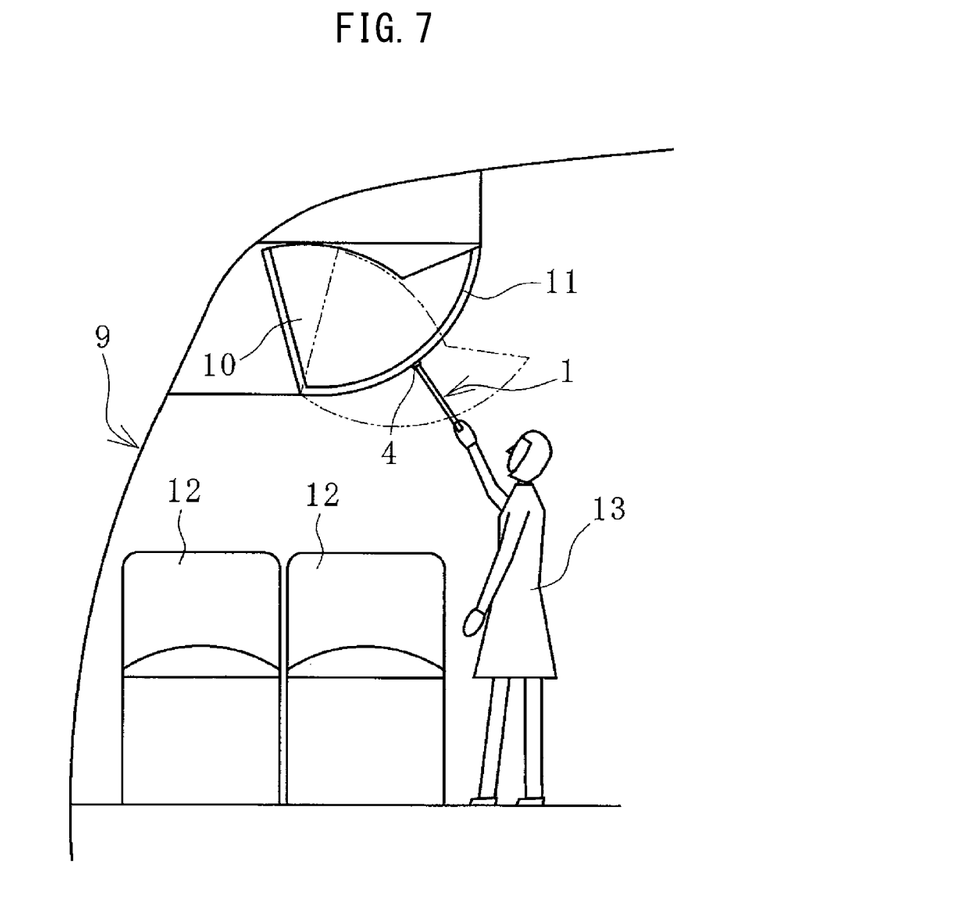
FIG. 7 is an explanatory drawing exemplifying the checking and the correction of the imperfect locking state of the door of an overhead luggage compartment using the lock checking tool of the present invention in an aspect which is different from that of FIG. 6.

In another usage example of the lock checking tool 1 as illustrated in FIG. 7, the overhead luggage compartment 10 is configured as an accommodation portion having an inverted L-shape cross section using two front and back partition plates and does not have an independent door 11. However, the overhead luggage compartment 10 alternately switches between a closed position illustrated by a solid line and a position where a front side is opened as illustrated by virtual lines so that the partition plate of the front side substantially functions as the door. Accordingly, in the present invention, with respect to the overhead luggage compartment 10 configured as the accommodation portion having the inverted L-shape cross section as illustrated in FIG. 7, the partition plate of the front side is interpreted as the door of an overhead luggage compartment 11. When the incomplete locked state of the door of an overhead luggage compartment 11 is inspected, similarly to the case of FIG. 6, the pressure contact part 4 of the lock checking tool 1 may be brought into contact with the surface of the partition plate at the front side and pushed.

After completing the checking operation and the correction operation, if the lock checking tool 1 remains in the extended state, the lock checking tool 1 becomes an obstacle when other operations are performed. In the lock checking tool 1 of the present invention, since the main body 2 can be shortened to the shortest state, the cabin crew 13 accommodates the lock checking tool 1 in the airline-company-specified portable bag which is always held by the cabin crew 13 during working, and accordingly, the cabin crew 13 can perform other works without obstacles.

To allow the lock checking tool 1 of the present invention to be accommodated in the portable bag when not in use, the length from the rear end of the main body 2 to the tip of the pressure contact part 4 when the main body 2 is in the shortest state may be 20 cm or less, preferably 19 cm or less, and more preferably 18 cm or less. Further, to smoothly perform the checking operation and the correction operation of the incomplete locked state of the door of an overhead luggage compartment 11, the length from the rear end of the main body 2 to the tip of the pressure contact part 4 when the main body 2 is in the longest state may be at least 30 cm or more, preferably 34 cm or more, and more preferably 38 cm or more. However, when the length is too long the operations are difficult. Therefore, an upper limit of the length is preferably about 60 cm.

Use of the lock checking tool 1 of the present invention is not limited to the door of an overhead luggage compartment 11 of the passenger aircraft described above, but the lock checking tool 1 can be effectively used to the door of an overhead luggage compartment 11 provided to the railway passenger train and the motor coach. Further, fixing means 6 for locking the expansion and contraction length of the main body 2 of the telescopic structure is not limited to the above embodiments, and fixing means of other structures may be used. The present invention can employ not only a configuration in which the fixing means 6 fixes the length of the main body 2 to any length, but also a configuration in which the length of the main body 2 is fixed to the length set in advance.

REFERENCE SIGNS LIST

1 Lock checking tool
2 Main body
2a, 2b, 2c Tube material
3a Guide groove
3b Guide projection
4 Pressure contact part
4a Base
4b Elastic piece
5 Grip section
6 Fixing means
7a Ring
7b Bracket
7c Shaft
7d Cam
7e Lever
7f Pin
8 Strap
9 Passenger aircraft
10 Overhead luggage compartment
11 Door of an overhead luggage compartment
12 Seat
13 Cabin crew

The invention claimed is:

1. A lock checking tool for a luggage compartment door which is provided above a seat of a passenger aircraft, comprising:
   a main body formed into a telescopic structure by a plurality of tube materials of different diameters;
   a grip section provided to the tube material on the outermost side of the main body;
   a pressure contact part provided to a tip end section of the tube material on the innermost side of the main body, wherein the pressure contact part comprises a base and a plurality of elastic pieces which extend from the base to a tip side of each of the elastic pieces, each of the plurality of elastic pieces becoming thin gradually as it goes from the base to its respective tip side, whereby when a tip of the pressure contact part is pressed against a surface of the luggage compartment door, each of the plurality of elastic pieces is deformed so as to widen outside and come into close contact with the surface of the luggage compartment door; and
   a fixing means for fixing a length of the main body.

2. The lock checking tool for the luggage compartment door according to claim 1, wherein the number of the tube materials forming the telescopic structure is three.

3. The lock checking tool for the luggage compartment door according to claim 2, wherein a length from a rear end of the main body to a tip of the pressure contact part when the telescopic structure is in a shortest state is 20 cm or less and the length from the rear end of the main body to the tip of the pressure contact part when the telescopic structure is in a longest state is 30 cm or more.

4. The lock checking tool for the luggage compartment door according to claim 1, wherein a length from a rear end of the main body to a tip of the pressure contact part when the telescopic structure is in a shortest state is 20 cm or less and the length from the rear end of the main body to the tip of the pressure c tact part when the telescopic structure is in a longest state is 30 cm or more.

5. The lock checking tool for the luggage compartment door according to claim 1, wherein the fixing means is capable of fixing a length of the main body to any length between the shortest state and the longest state.

6. The lock checking tool for the luggage compartment door according to claim 1, wherein the plurality of the elastic pieces are projected in a point symmetry on the surface of the base with respect to the center of the surface of the base.

* * * * *